United States Patent [19]
Crain

[11] 4,380,987
[45] Apr. 26, 1983

[54] CIRCULATING FUEL HEATING SYSTEM FOR INTERNAL COMBUSTION ENGINES

[76] Inventor: Theron H. Crain, Rte. 7, Box 164-B, Muskogee, Okla. 74401

[21] Appl. No.: 241,585

[22] Filed: Mar. 9, 1981

[51] Int. Cl.³ .......................................... F02M 31/00
[52] U.S. Cl. .................................. 123/558; 123/514; 123/516
[58] Field of Search ............... 123/514, 516, 557, 558; 48/180 C

[56] References Cited

U.S. PATENT DOCUMENTS

| | | | |
|---|---|---|---|
| 1,623,074 | 4/1927 | Tartrais | 123/557 |
| 2,323,525 | 7/1943 | Ebel | 123/516 |
| 2,599,699 | 6/1952 | Dilworth | 123/516 |
| 3,354,872 | 11/1967 | Gratzmuller | 123/557 |
| 3,913,543 | 10/1975 | Richard | 123/557 |
| 4,083,340 | 4/1978 | Furr | 123/558 |
| 4,343,283 | 8/1982 | Shepherd | 123/514 |

FOREIGN PATENT DOCUMENTS 2324888  4/1977  France ........................... 123/516

*Primary Examiner*—Ronald H. Lazarus
*Attorney, Agent, or Firm*—Head, Johnson & Stevenson

[57] ABSTRACT

A circulating fuel heating system for internal combustion engines of both gas and diesel types. The system is sizeable through staged heat exchanger components to provide the necessary fuel heating for various engine sizes and fuel consumption rates. The system basically comprises a plurality of staged fuel/hot water heat exchangers, a fuel controller interposed between the heat exchangers and the carburetor bowl, a by-pass/metering valve and a vapor capture system for returning unused fuel to the heat exchanger and a fuel/exhaust manifold heat exchanger operably connected to the controller to satisfy initial heating requirements for the period after cold-engine starting.

16 Claims, 3 Drawing Figures

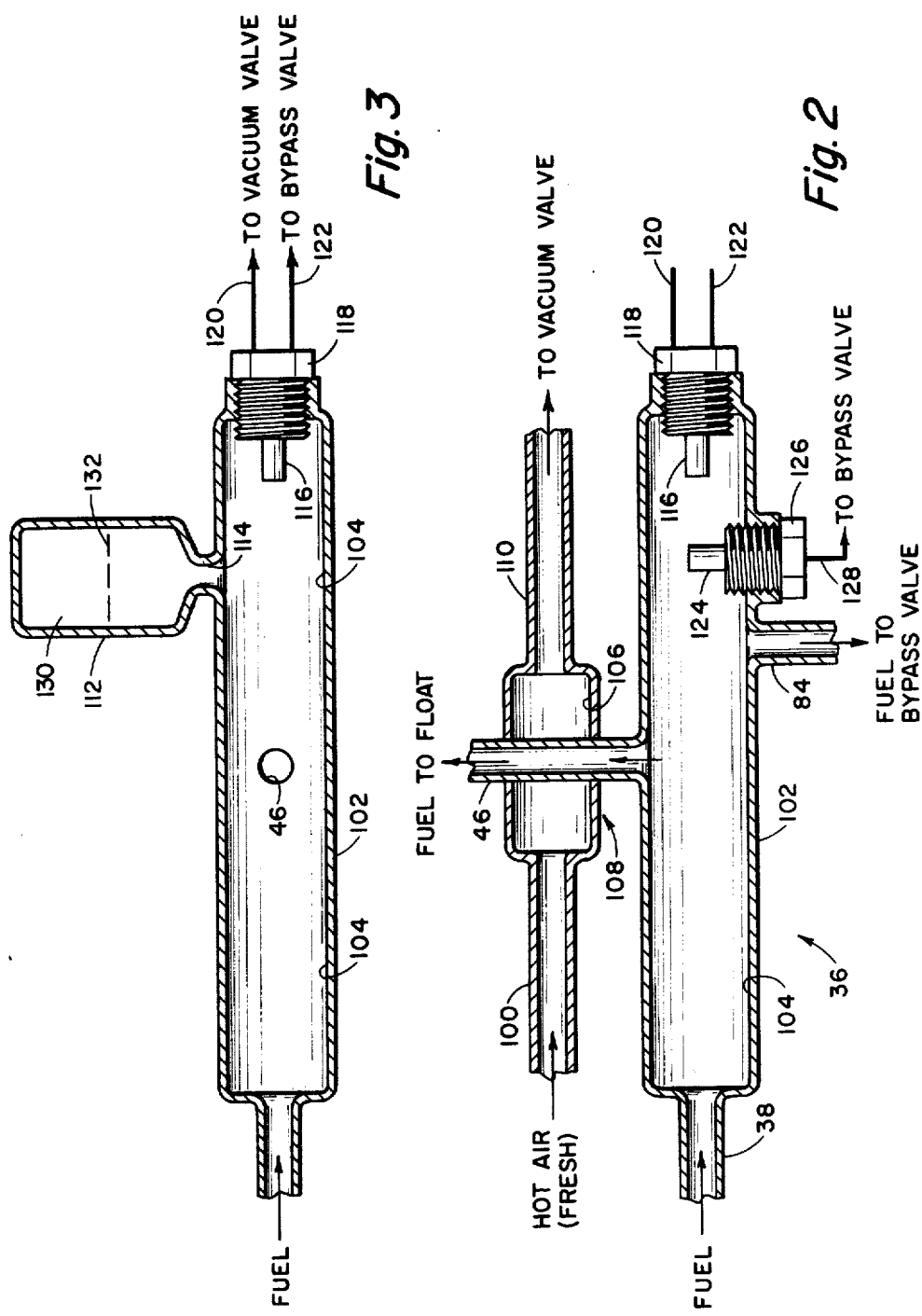

CIRCULATING FUEL HEATING SYSTEM FOR INTERNAL COMBUSTION ENGINES

BACKGROUND OF THE INVENTION

1. Field of the Invention

The present invention relates to a fuel heating system for internal combustion engines and more particularly, but not by way of limitation, to a continuous circulating fuel heating system for raising and maintaining fuel temperature to its vaporization temperature at the introduction to the carburetor.

2. History of the Prior Art

It has long been recognized that increased fuel economy can be realized if the temperature of the fuel, prior to entering the carburetor, can be raised to its vaporization temperature so that upon encountering the low pressure in the carburetor barrel, it completely vaporizes providing more complete combustion and, hence, providing more efficient power conversion.

Since it is necessary to keep such heated fuel systems under pressure to maintain the fuel in the desired liquid state prior to entering the carburetor, the previous systems include a fuel pressure regulator interposed in the line connecting the hot fuel supply to the carburetor as taught in the patent to Furr et al, U.S. Pat. No. 4,083,340, issued Apr. 11, 1978 and entitled "Gasoline Superheater."

The primary disadvantage to such systems is that they are unable to adjust to different fuel flow rates needed when changing engine speed and, hence, fuel demands.

For example, when the engine speed is high or under laboring conditions, the fuel flows rapidly through the regulator providing heated fuel to the carburetor. However, during slow driving or idle when the engine is not laboring, fuel demand is less and fuel therefore backs up in the line between the pressure regulator and the heat exchanger and, hence, cooling occurs. Then when high fuel demand resumes, this cooled fuel is supplied to the carburetor shortly thereafter followed by superheated fuel which causes the mixture to be constantly fluctuating leading to inefficient and rough engine operation.

Further, if the superheater of the Furr et al patent is properly sized for typical fuel consumption, it may be inadequate during periods of great fuel demand.

SUMMARY OF THE PRESENT INVENTION

The present invention provides a circulating fuel heating system for providing a continuous supply of heated fuel to the carburetor regardless of the level of fuel demand to substantially maintain the heat in the carburetor bowl at vaporization temperature.

The present system comprises a plurality of stacked counter-flow heat exchangers which utilizes the heat provided by the vehicle hot water circulating system to the heater. The number of stacked heat exchanger units is dictated by engine size and fuel consumption rates. Naturally, a practical consideration is the available space under the hood of the vehicle.

A first of these heat exchangers can comprise the fuel line being helically wrapped around the heater hoses for initially heating the fuel after it leaves the fuel pump. An auxiliary electrical fuel pump may be installed in parallel with the existing pump to provide the necessary flow of fuel through the circulating system.

The remaining stacked heat exchangers are counter-flow hot water heat exchangers located as close to the carburetor as possible.

A fuel controller is connected between the last staged heat exchanger and the carburetor fuel bowl to provide a constant supply of fuel to the carburetor. The temperature of the fuel in the controller is maintained constantly at a pre-set temperature monitored by a temperature sensor in the controller.

The second outlet of the controller is connected to a metering/dump valve which, in turn, is connected back into the fuel line upstream of the fuel pump or pumps. Therefore, fuel is constantly circulating through the heat exchangers and controller regardless of engine demands.

During cold start conditions, a fresh air exhaust manifold heat exchanger provides heat to the controller to improve efficiency before the hot water heat exchangers have brought the fuel up to operating temperature.

A vapor capture system is also provided and comprises a condenser to convert the fuel back into liquid and return the fuel into the fuel lines upstream of the fuel pumps rather than back into the tank as is the case with conventional systems. Any excess vapor from the condenser is fed into the breather or the intake manifold, all of which results in total vapor capture with a minimum loss of heat to the fuel.

Further, fuel line expander chambers are provided to prevent already-heated fuel from backing up along the fuel lines into the fuel tank thereby avoiding needless loss of fuel temperature during periods of low fuel consumption during engine idle or low-running power conditions.

Therefore, although the present circulating system requires more heat than a direct-line heating system, greater efficiency is obtained by maintaining a constant supply of high temperature fuel at the carburetor regardless of engine operating conditions.

DESCRIPTION OF THE DRAWINGS

Other and further advantageous features of the present invention will hereinafter more fully appear in connection with a detailed description of the drawings in which:

FIG. 2 is a top plan sectional view of the fuel controller of the present invention.

FIG. 3 is an elevational sectional view of the controller of FIG. 2.

DESCRIPTION OF THE PREFERRED EMBODIMENT

Figure 1:
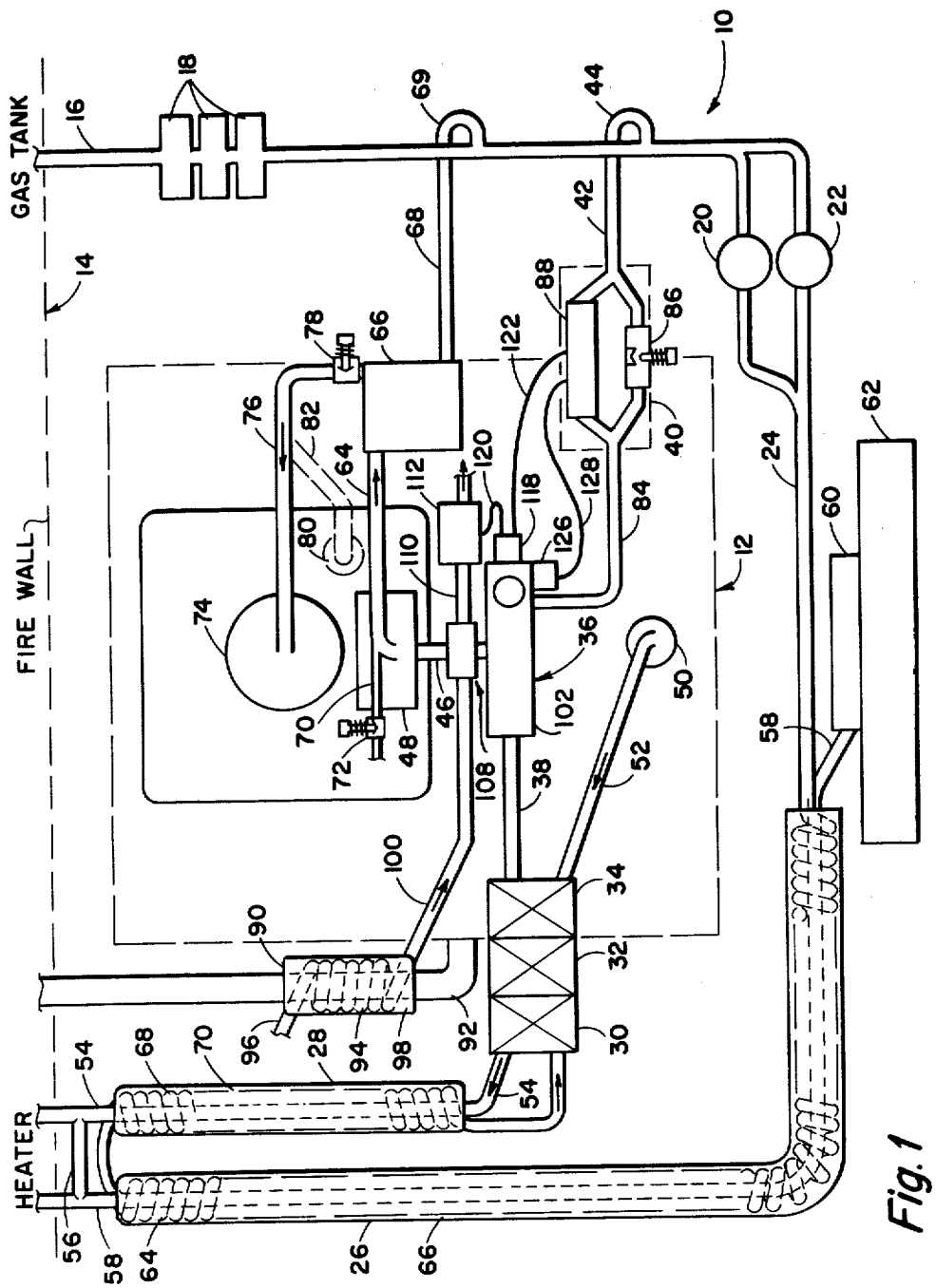
FIG. 1 is a schematic flow diagram of a circulating fuel heating system embodying the present invention.

Referring to the drawings in detail, reference character 10 generally indicates a circulating fuel heater system operably connected to an internal combustion engine indicated by reference character 12. The engine 12 is of a typical internal combustion type for the conversion of either gasoline or diesel fuel into mechanical energy. Reference character 14 generally indicates schematically the fire wall of the engine compartment having an inlet fuel line 16 which is connected to a remotely positioned fuel tank (not shown). It is noted at this point that the placement of the components shown in the drawing of FIG. 1 may vary considerably depending on the design of the engine compartment.

The fuel line 16 is provided with a plurality of expander compartments 18 which have the effect of simply enlarging the volume of the fuel in the lines forward of the fire wall for a purpose that will be hereinafter set forth. The fuel line 16 then is provided with a pair of parallel-operated fuel pumps 20 and 22, one or both of which may be of the electrical positive displacement type fuel pumps.

Reference character 24 represents the fuel line downstream of the fuel pumps 20 and 22 and serves to pass the fuel through a plurality of cascaded heat exchangers 26, 28, 30, 32 and 34, which will be hereinafter more fully described. The fuel from the plurality of heat exchangers is then provided to a controller generally indicated by reference character 36 via line 38.

Fuel passes from the fuel controller 36 to a fuel metering/by-pass valve 40 and in turn back into the fuel line 16 by way of a conduit 42 to a J-fitting 44 upstream of the fuel pumps 20 and 22. Fuel also passes from the controller 36 through a line 46 into a carburetor bowl 48 in a manner that will be hereinafter set forth.

Hot water from the engine is provided from a port 50 through a line 52 operably connected to the heat exchangers 34, 32 and 30, respectively. The hot water from said heat exchangers then passes through the heat exchanger 28 by way of a heater hose line 54. The hot water is then either circulated through the vehicle heater (not shown) or by way of a cross-over pipe 56 to a heater return line 58. The heater return line 58 then is passed through the heat exchanger 26 through the vehicle water pump 60 and, hence, to the vehicle radiator 62 where it is then routed back to the engine 12.

The heat exchanger 26 comprises a plurality of helical wraps 64 of the fuel line 24 jacketed by insulation material 66. Likewise, the heat exchanger 28 comprises a plurality of helical wraps 68 of the fuel line again jacketed by an insulation wrap 70. The heat exchangers 30, 32 and 34 are counter-flow heat exchangers wherein heat from the hot water is transferred to the fuel by conduction. The number of staged heat exchangers in the present invention is dependent upon the size of the engine and the fuel demands thereof.

For instance, to adequately provide heating for a large truck may require several staged heat exchangers wherein the heating of fuel under the present invention for a small compact vehicle might require only one.

Excess vapor is removed from the carburetor bowl 48 by means of a draw tube 64 which is operably connected to a condenser 66 which serves to lower the temperature of the fuel to below that of vaporization, the liquid therefrom being returned back to the fuel line 16 through a conduit 68 and a J-return fitting 69 in a manner that will be hereinafter set forth. The fuel being drawn from the bowl may be mixed with atmosphere by way of relief tube 70 through a metering orifice 72. Any excess vapor from the condenser 66 is returned back to a carburetor breather 74 by way of conduit 76, again through a metering orifice 78. As an alternative, this excess vapor can be returned directly to an engine intake manifold 80 by way of conduit 82 shown in dashed lines.

The by-pass valve 40 for completing the fuel circulation system comprises an inlet line 84 connected between the controller 36 and the metering/by-pass valve 40. The metering/by-pass valve 40 comprises a metering orifice 86 connected in parallel with an electrically operated by-pass valve 88.

A fresh air exhaust manifold heat exchanger 90 is operably connected to an engine exhaust manifold 92. The heat exchanger 90 comprises a helical conduit 94 which is wrapped around the exhaust manifold 92 and having a fresh air inlet port 96. The helically wrapped portion is then covered by a shroud 98 and is, in turn, operably connected to the controller 36 by a hot air conduit 100.

Referring now to FIGS. 2 and 3 of the drawings, the controller 36 comprises a main housing 102 having a fuel chamber 104 therein. The housing may be cylindrical in shape having an inlet and being operably connected to the stacked heat exchangers 30, 32 and 34 by the conduit 38. One outlet line 84 is operably connected to the metering/by-pass valve 40 as hereinbefore set forth. The second outlet 46, which is operably connected to the carburetor bowl 48 is passed through a hot air chamber 106 forming a hot air heat exchanger generally indicated by reference character 108. One end of the chamber 106 is connected to the hot air heat exchanger 90 by way of the hot air inlet line 100 hereinbefore described. The outlet to the heat exchanger 108 is provided by a conduit 110 which is operably connected to an electrically operated vacuum valve 112 for selectively pulling the hot air from the heat exchanger 90 through the exchanger 108 in a manner that will be hereinafter set forth.

An upwardly extending closed buffer housing 112 is operably connected to the chamber 104 of the controller through a port 114. The buffer 112 may be attached directly to the top of the controller housing 102 or located remotely therefrom so long as it is positioned at an elevation above said controller housing.

A temperature sensor 116 is located inside the chamber 104 and is operably connected to a sender 118. The sender 118 is provided with a first electrical line 120 which is operably connected to the vacuum valve 112 for opening said valve when the temperature within the chamber 104 falls below a pre-set temperature. A second electrical outlet line 122 is operably connected to the by-pass valve 88 and provides an electrical signal thereto when the temperature rises above a pre-set limit for a purpose that will be hereinafter set forth.

A pressure sensor 124 is located within the chamber 104 and is operably connected to a sending unit 126. The sending unit 126 is provided with an electrical output line 128 which is also connected to the by-pass valve 88 for safety purposes to open said by-pass valve when the pressure in the chamber 104 exceeds a pre-set level.

Operation of the system would be generally as follows. In starting a cold engine, fuel is pumped into the system by fuel pumps 20 and 22 through fuel inlet line 116. Fuel is routed through the stacked heat exchangers 26, 28, 30, 32 and 34 to the controller 36. The fuel necessary for engine operation is provided from the controller 36 through conduit 46. The remaining fuel from the controller is then routed via conduit 84 through the metering valve 86 back into the fuel line 16 upstream of the fuel pumps 20 and 22. Since, at this point, the fuel is at or below ambient temperature and at a low pressure, the temperature and pressure senders 118 and 126, respectively, will have the by-pass valve 88 closed off so that all of the returned fuel is passed through the metering valve 86. However, since the fuel will be below the pre-determined setting of the temperature sender 118, a signal will be provided to the vacuum valve 112 for opening the vacuum valve and drawing air from the exhaust manifold through the heat exchanger 90.

Since the exhaust manifold 82 achieves a high temperature much faster than the stacked hot water heat exchangers, hot air will be drawn through the conduit 100 and, hence, through the controller heat exchanger 108 for pre-heating the fuel as it enters the carburetor bowl shortly after starting the engine. Any excess vapor in the carburetor bowl 48 will then be captured and routed through the condenser 166 for return to the fuel line 16. It is noted at this point that the J-fittings 44 and 69 for returning fuel to the fuel line are physically located at an elevation below the fuel line to serve as a liquid fuel trap.

After the engine has been in operation for several minutes, the fuel in the main controller chamber 104 will be brought up to the specified temperature range due to operation of the staged hot water heat exchangers 26, 28, 30, 32 and 34. Once the fuel in the controller chamber 104 rises above the low temperature setting of the sender 118, the signal is removed from the vacuum valve 112 thereby cutting off the flow of hot air through the heat exchanger 108 of the controller 36.

As long as the temperature and pressure stay within the desired limits within the controller 36, the warm fuel continues to circulate through the metering valve 86 back into the line 16 thereby maintaining a substantially continuous circulation of fuel through the heating system dependent upon operation of the fuel pumps 20 and 22. Slight variations in pressure in the system are taken care of by the buffer chamber 112 that is operably connected to the top of the main controller chamber 104.

Referring to FIG. 3 of the drawings it can be seen that air or gas will be trapped in the upper portion of the buffer as indicated by reference character 130 and since this gas is compressible it will act as a cushion on the fuel liquid level 132 in the buffer.

Should the temperature inside the controller chamber 104 become too high, such as during low fuel consumption operation of the engine during idle or low power requirements, the temperature sensor 118 will provide a signal to the by-pass valve 88 by way of line 122 in order to open the by-pass valve 88 to allow fuel to circulate more rapidly through the heating system thereby having a cooling effect on the fuel.

The pressure sender 116 is primarily a back-up safety device and will very seldom come into use but will likewise cause the by-pass 88 to open should the pressure in the controller chamber 104 become too high. Throughout operation of the system excess vapor in the carburetor bowl 48 is captured by way of the condenser 66, liquid return line 68 and vapor return line 76.

Therefore, it is seen that regardless of the engine operating speed or condition, ample fuel is always available at the carburetor bowl to supply the fuel demand due to the constant circulation of fuel through the system. During high engine speeds and high power requirements, there will be very little vapor capture necessary since the fuel demand from the engine will be greatest at that point from the carburetor bowl.

On the other hand, during idle conditions or low power running requirements, the fuel is constantly circulated through both the metering/by-pass valve 40 and the vapor capture system including the condenser 66.

From the foregoing it is apparent that the present invention provides a fuel heating system that provides for constant circulation of the fuel with a minimum loss of heat even during fluctuating temperature operations. It is also noted at this point that upon opening the by-pass valve 88 some back pressure may build up in the upstream line from the fuel pumps 20 and 22 but will not force the already heated fuel all the way back to the gas tank due to the line enlargement chambers 18. This is very beneficial since the temperature under the hood of an operating vehicle is normally higher than temperature at the fuel tank.

Whereas the present invention has been described in particular relation to the drawings attached hereto, other and further modifications apart from those shown or suggested herein may be made within the spirit and scope of the invention.

For example, where under-the-hood space is at a premium, the heater hose exchangers 26 and 28 may be necessary or desirable for helping maintain the fuel in the circulating system at a sufficiently high temperature. In some cases where there is plenty of room under the hood, the high temperature requirements may be met by simply stacking a sufficient number of hot water counterflow heat exchangers 30, 32 and 34 without wrapping the heater hoses. Therefore, the system is very much adjustable in relation to both fuel consumption and hood space of the vehicle.

What is claimed:

1. A circulating fuel heating system for internal combustion engines having a carburetor, said system comprising heat exchanger means for raising fuel to beyond its vaporization temperature, pump means for delivering fuel to said heat exchanger means, a heat source carried by the engine and operably connected to the heat exchanger means for raising the temperature of said fuel, a fuel flow controller operably connected between the heat exchanger means and the carburetor, return control means operably connected between the fuel flow controller and the pump means for routing a first portion of unused fuel back to said pump means and a vapor capture means operably connected between the carburetor and the pump means for routing a second portion of unused fuel back to the pump means.

2. A fuel heating system as set forth in claim 1 wherein said heat source comprises a hot water outlet port, a hot water line and a return line, said hot water line and return line being operably connected to said heat exchanger means.

3. A fuel heating system as set forth in claim 2 wherein the heat exchanger means comprises a helically coiled fuel line wrapped in intimate contact with said hot water and return lines.

4. A fuel heating system as set forth in claim 2 wherein said heat exchanger means comprises at least one counter-flow heat exchanger for providing conduction heating of said fuel from said heat source.

5. A fuel heating system as set forth in claim 4 and including a plurality of said counter-flow heat exchangers in cascade arrangement.

6. A fuel heating system as set forth in claim 1 wherein said pump means comprises a pair of parallel fuel pumps, at least one said pump being electrically operated.

7. A fuel heating system as set forth in claim 1 wherein said fuel flow controller comprises a fuel chamber disposed in the proximity of the carburetor and having a first outlet operably connected to the carburetor and a second outlet operably connected to said return control means, said return control means comprising a metering valve for the control of fuel flow therethrough.

8. A fuel heating system as set forth in claim 7 wherein said return control means further comprises a by-pass valve connected in parallel with said metering valve and being operably connected to the fuel flow controller, a temperature sensor carried by said controller and in communication with said fuel chamber for opening said dump valve when the temperature in said chamber exceeds a pre-determined value.

9. A fuel heating system as set forth in claim 8 wherein said fuel flow controller comprises a pressure sensor carried by said controller and in communication with said fuel chamber for opening said by-pass valve when the pressure in said chamber exceeds a pre-determined value.

10. A fuel heating system as set forth in claim 7 and including a pressure buffer chamber having a closed upper end, the lower end thereof being operably connected to the top of said fuel chamber.

11. A fuel heating system as set forth in claim 1 wherein said vapor capture means comprises a fuel vapor condenser having a vapor inlet port operably connected to the carburetor and a liquid outlet port operably connected to said pump means and a vapor outlet port operably connected back to said carburetor.

12. A fuel heating system as set forth in claim 11 wherein said carburetor is provided with a breather, said vapor outlet port of the condenser being operably connected to the breather.

13. A fuel heating system as set forth in claim 11 wherein said carburetor comprises a fuel intake manifold said vapor outlet port of said condenser being operably connected to said intake manifold.

14. A fuel heating system as set forth in claim 1 and including at least one fuel line enlargement chamber operably connected to said pump means for retarding the back flow of fuel upstream of said pump means.

15. A fuel heating system as set forth in claim 7 wherein said fuel flow controller comprises second fuel heat exchanger means disposed between said fuel chamber and the carburetor, a second heat source operably connected to said second fuel heat exchanger means for selectively heating the fuel between said fuel chamber and entry of the fuel into the carburetor.

16. A fuel heating system as set forth in claim 15 wherein said second heat source comprises a fresh air exhaust manifold heat exchanger for extracting heat from an exhaust manifold of the engine, and said second heat exchanger means comprises a hot air chamber disposed between the fuel chamber and the carburetor, said hot air chamber being operably connected to the fresh air exhaust manifold heat exchanger, and a vacuum valve operably connected to said hot air chamber for drawing the hot fresh air from the exhaust manifold heat exchanger through said hot air chamber, a second temperature sensor carried by said fuel chamber and operably connected to said vacuum valve for controlling the flow of hot air through said hot air chamber.

* * * * *